(No Model.) 2 Sheets—Sheet 1.

B. B. QUINN.
APPARATUS FOR MAKING AND FILTERING BRINE.

No. 409,234. Patented Aug. 20, 1889.

WITNESSES
H. A. Biddle
Willis Robb

INVENTOR
B. B. Quinn (No Model.) 2 Sheets—Sheet 2.

B. B. QUINN.
APPARATUS FOR MAKING AND FILTERING BRINE.

No. 409,234. Patented Aug. 20, 1889.

WITNESSES
INVENTOR

UNITED STATES PATENT OFFICE.

BARTHOLOMEW B. QUINN, OF CLEVELAND, OHIO.

APPARATUS FOR MAKING AND FILTERING BRINE.

SPECIFICATION forming part of Letters Patent No. 409,234, dated August 20, 1889.

Application filed April 27, 1889. Serial No. 308,785. (No model.)

*To all whom it may concern:*

Be it known that I, BARTHOLOMEW B. QUINN, a resident of Cleveland, in the county of Cuyahoga and State of Ohio, have invented a certain new and Improved Apparatus for Making and Filtering Brine; and I do hereby declare that the following is a full, true, and exact description thereof.

My invention relates to means for the production of brine from rock or coarse salt and filtering the same.

The object of my invention is to so arrange the different parts of said apparatus as to combine simplicity and efficiency in mechanism with an easy method of freeing or cleaning said parts from the deposits which accumulate during the use of said apparatus.

That the invention may be fully understood, reference will be had to the annexed specification and accompanying drawings, in which—

Figure 1:
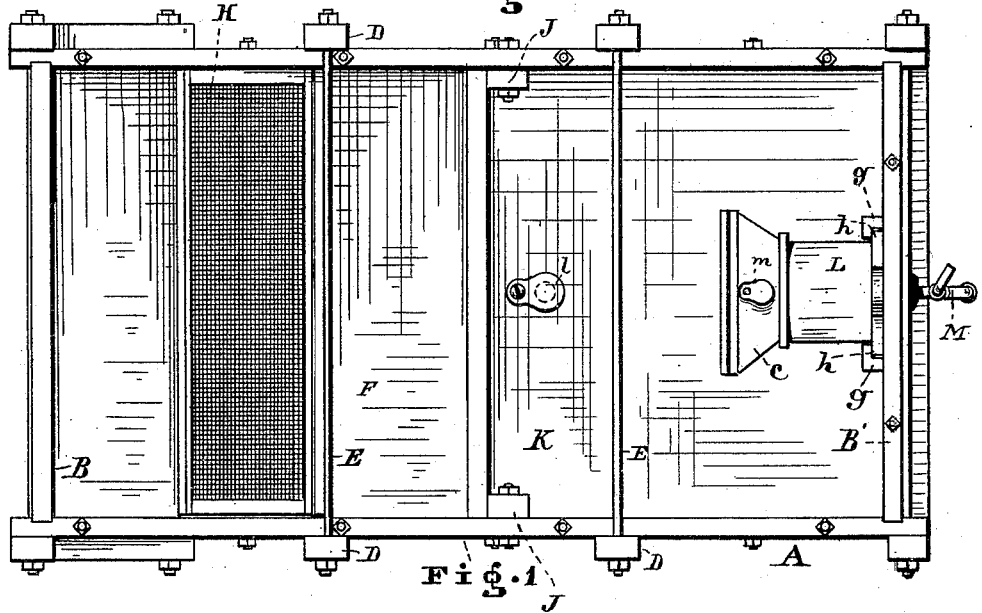
Figure 2:
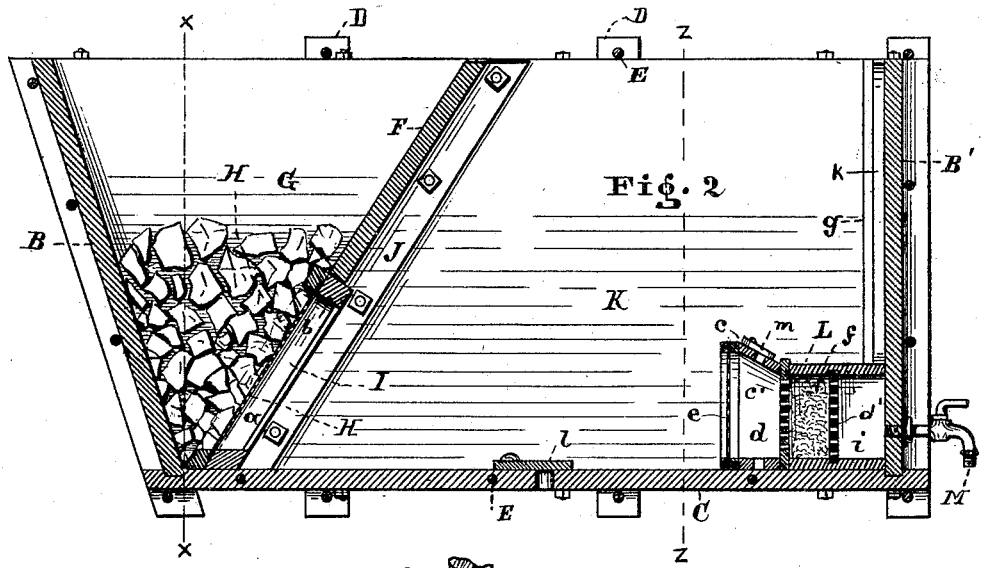
Figure 3:
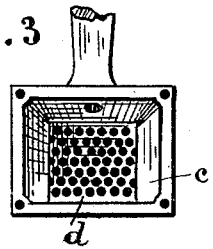
Figure 4:
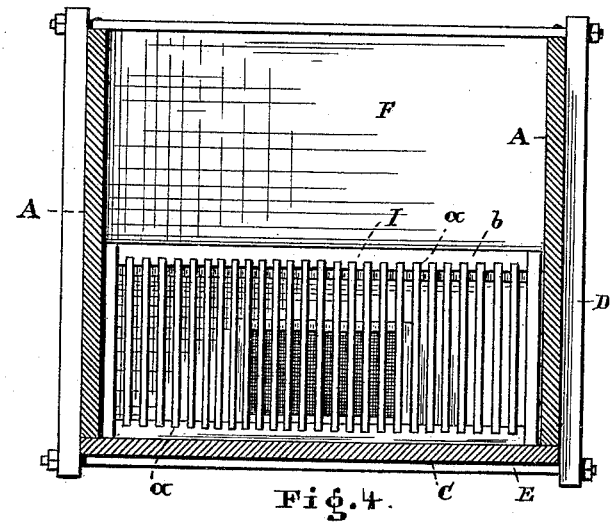
Figure 5:
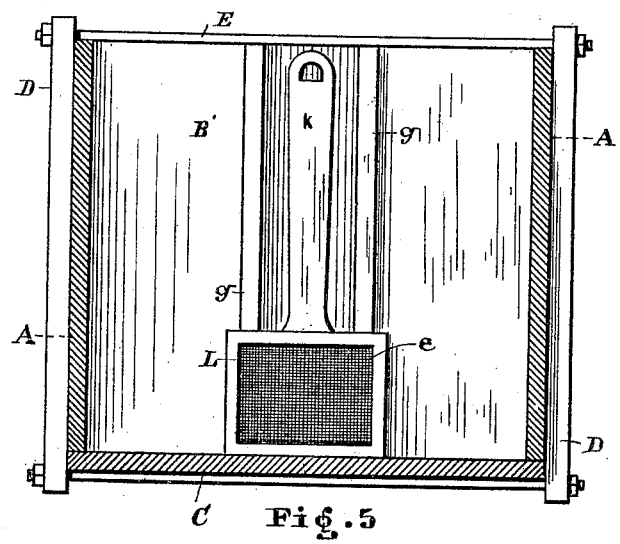

Figure 1 is a plan view of said apparatus. Fig. 2 is a central vertical section of the same. Fig. 3 is an interior view of a filtering device forming a part of the apparatus. Fig. 4 represents a transverse vertical section of said apparatus on line $x\ x$, Fig. 2; and Fig. 5 is a like section on line $z\ z$.

Like letters of reference refer to like parts in the drawings and specification.

The apparatus, as represented in Figs. 1 and 2, consists, preferably, of a wood tank in part, and is built of planks which are held water-tight by means of vertical and transverse rods.

In the drawings, the sides A A, ends B B', and bottom C, however, do not indicate the joints of said planks, inasmuch as any and various widths of planks may be used to build up said sides, ends, and bottom, which, by means of the stringers D and the crossrods E, are braced and held in proper relation with each other, forming the tank of the apparatus.

As seen in Fig. 2, the end B is inclined outward, and forms, with the reversely-inclined partition F, the tapering compartment G, in which the rock or coarse salt is placed for the purpose of being dissolved, while a stream of water is run over or through. The saturated water or brine therefrom is allowed to pass off through the screen H, which rests on top of the rack I. Said rack consists of a series of slats $a$, which are inserted into the frame $b$, as seen in Figs. 2 and 4. The frame $b$ is laid upon the cleats J J and constitutes the lower part of the partition F—that is, it fits between the sides of the tank and runs in line with the plane of the cleats.

The compartment K, adjoining that of G, is intended for the accumulation of brine from the rock-salt, and within said compartment, in connection with the side B', is placed the filtering device L, as seen in Figs. 1, 2, and 3, the object of which is to filter the brine before it is drawn off by means of the cock M. Substantially the filter L consists of a compartment-box having a flaring inlet side $c$ and two perforated partitions $d\ d'$, forming the division-chambers $c'$, $f$, and $i$ thereof, as seen in Figs. 2 and 3. Over the flaring front side is stretched a canvas $e$, Fig. 5, which protects the filtration through the chamber $f$ by preventing the refuse from the salt from filling up the holes in the partitions $d\ d'$, and thereby choking up the sponge within said chamber. The guides $g$ retain the rear end of said filter in contact with the side B' by means of the flanges $h\ h$, Fig. 1, and thus an outer chamber $i$ is formed, into which the cock M opens.

On pouring water over and through the rock or coarse salt deposited in the compartment G it becomes saturated by said deposits and passes therefrom through the screen and rack into the compartment K as brine, in which state it undergoes filtration through the canvas $e$ and the spongy material within the chamber $f$ and gathers in the chamber $i$, to be drawn off by means of the cock M, Fig. 2.

When it becomes necessary to clean the tank, the screen H and rack I may be raised or taken out and the filter L lifted by means of the handle $k$, which clears the entire area of the floor of any and all obstructions. The lids $l$ and $m$, or equivalent means by which the openings $l'$ and $m'$ in the tank and filter are covered, are pushed aside or removed and a hose from the hydrant is inserted through the opening in the filter for the purpose of washing out said filter and tank.

Fig. 3 illustrates a face view of the flaring side of the filter L and one of the perforated partitions located therein, the canvas e being removed in that figure.

By means of the acute angular compartment G the rock or coarse salt is constantly directed during its saturation to a converging point only, so that the entire mass of salt in the compartment will, as it is being dissolved, descend in a diminishing space toward the angular bottom without waste of the saline properties, as the water can be effectually disseminated through the whole mass, which is not as effectually done in case of a compartment having a flat floor area, in which more or less salt will lodge at the corners of such floors, where it remains undissolved and must either be removed in clearing out the refuse of the salt from such chamber or dissolved by special means.

By having the screen H in an angular or inclined position, as shown in Fig. 2, it can be readily drawn or caused to slide upward on the partition F sufficiently to allow of washing or cleaning out the sediment and refuse which may have accumulated in the compartment G and the said screen and rack. On raising the rack and screen the entire floor area of the tank is set free from obstructions, which facilitates the labor of cleaning the apparatus. The chamber $i$ of the filter L assures of an easy and steady flow of brine through the cock M, as it serves as a reservoir to draw the liquid from.

What I claim, and desire to secure by Letters Patent, is—

1. The combination, in an apparatus for making and filtering brine, of a vertically-tapering depositing-compartment for the rock or coarse salt, having a screen and rack, and a filtering device consisting of a compartment-box with flaring canvas-covered inlet, having perforated partitions traversing the interior thereof, with filtering material between the same, substantially as and for the purpose set forth.

2. In an apparatus for making and filtering brine, the combination of the screen H, the rack I, arranged in relation to and forming the lower part of the partition F, and the tapering compartment G and the filter L, with canvas $e$ and perforated partitions $d$ $d'$ in the interior thereof, forming chambers $c'$, $f$, and $i$, constructed and arranged substantially as and for the purpose set forth.

In testimony whereof I affix my signature in presence of two witnesses.

BARTHOLOMEW B. QUINN.

Witnesses:
W. H. BURRIDGE,
B. F. EIBLER.